Dec. 20, 1932.                S. C. VOLNEY                  1,891,251

MACHINE FOR PUNCHING FILMS

Filed April 6, 1929

INVENTOR:

Svatopluk C. Volney

Patented Dec. 20, 1932

1,891,251

UNITED STATES PATENT OFFICE

SVATOPLUK C. VOLNEY, OF NEW YORK, N. Y.

MACHINE FOR PUNCHING FILMS

Application filed April 6, 1929. Serial No. 353,039.

This invention is directed to apparatus adapted to be employed as an adjunct and accessory to a conventional motion picture projector and when so associated with such a projector is adapted to be employed for the cutting and punching of film while the film is passing through the projecting machine.

The primary purpose of the apparatus of this invention is to provide means whereby film may be marked at particular points optional with the operator. In other words, it is the purpose of this invention to permit the film to be run through a projecting machine and to associate with such a machine operating adjuncts whereby the operator or observer can punch, mark or otherwise delineate particular images on the film for future reference. In one practical way of using the invention, a machine embodying such invention is operated in synchronism with a standard motion picture projector, both of such machines being operated in synchronism so that one of them will project upon the screen the images of the film passing therethrough. A corresponding film is at the same time passed through the machine embodying this invention and as the operator, inspector, or observer watches the projected picture on the screen for defects or for other purposes, he has within his control mechanism of this invention so that when he observes some particular characteristic in the projected image that he wishes to make note of for future reference, he causes the operation of the machine equipped with this invention to mark upon the corresponding image of said machine, a mark, perforation or designation. After both films have passed through the machines as described, they may be removed from the machines, taken to the laboratory and there unrolled simultaneously and at the same linear speed while in side by side relation. The particular images to which the observer has desired to call attention are noted by the markings on one of said films and the corresponding image of the other film can be then readily inspected, corrected, cut out or modified in any manner well known to the art. It is thus apparent that the present invention provides for the expeditious and accurate marking of predetermined portions of the film for future reference, for the purpose stated and for other purposes which will be apparent to those skilled in the art.

In carrying out the present invention, I remove the optical system, and more particularly the objective lenses from a standard motion picture projector and place at the aperture spaced apart male and female dies so that as the film is run through the machine in a conventional way it passes between these dies and I so operatively connect the movable element of the die with the operating mechanism of the projector that the dies are only operable to punch the film during periods of rest or dwell of the film, i. e. during those periods at which the projection normally occurs. Means is further provided to control the effective operation of the dies so that their operation to perforate the film is directly within the control of the operator or observer who, preferably by a remote control, renders such dies effective to perforate the image which is positioned at the aperture at any particular time. It is of marked practical importance that the apparatus is so constituted that the punching operation occurs during only a relatively small part of the said period of dwell thereby allowing ample time for the dies to come together and move apart without producing any drag on the film as the latter comes to rest at the beginning of such period and starts to move at the conclusion thereof.

Features of the invention other than those specified will be apparent from the hereinafter detailed description when read in conjunction with the accompanying drawing.

Figure 1:
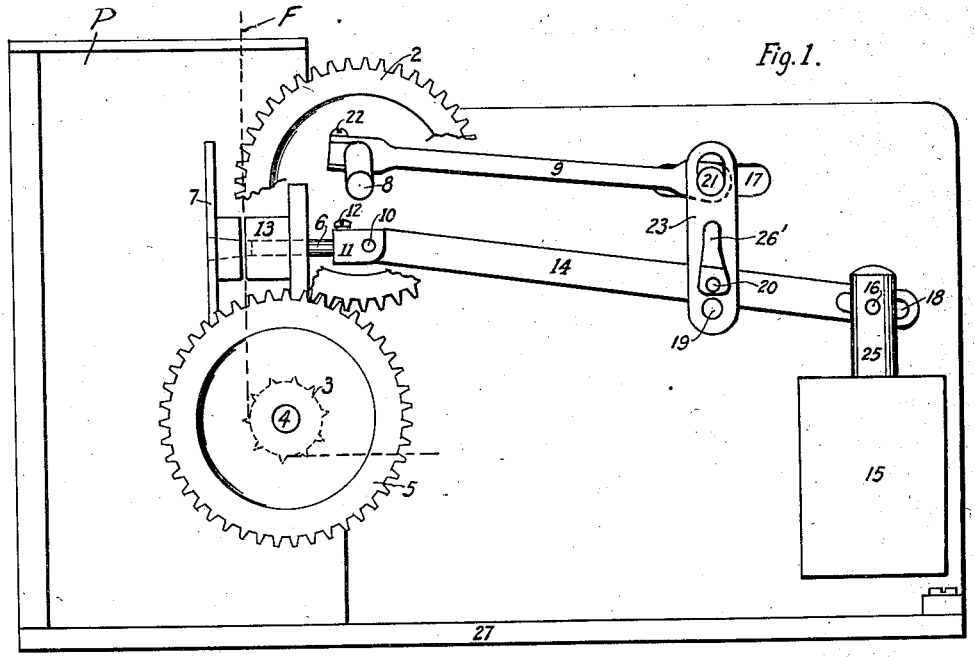
Figure 1 is a side elevation of apparatus embodying the present invention showing the associated conventional projector more or less diagrammatically.
Figure 2:
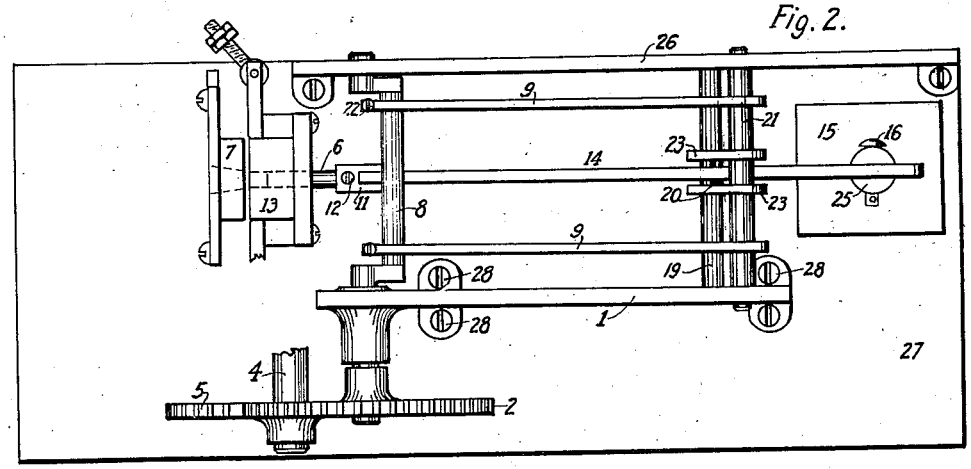
Figure 2 is a plan view of the apparatus of this invention.

Referring to the drawing, P designates a conventional projecting machine embodying a drive shaft 4 and a film sprocket 3, the latter of which is driven from the shaft 4 through the usual Geneva movement whereby the sprocket 3 is caused to make but one-quarter of a revolution for each full revolution of the shaft 4. In other words, the shaft 4 makes three-quarters of a revolution while the sprocket 3 remains stationary and during the last one-quarter of the revolution of such shaft, the film sprocket is rotated to advance the film F the distance of one image. The mechanism which I have thus far described is well known in the motion picture art, is entirely conventional, and I make no claim to this mechanism per se.

In adapting the invention to the conventional mechanism which I have described, I remove the objective lenses and in the aperture, I position the parts 7 and 13. The part 7 is a plate mounted firmly on the aperture frame of the machine and having therein an opening adapted to function as a female die. The part 13 is spaced from the part 7 a distance to permit the film to travel between them and is in the form of a guide having therein an opening aligned with the opening in the part 7. Through these aligned openings the punch 6 is adapted to reciprocate for the purpose of punching film positioned between these parts. This punch may be suitably disposed with respect to particular images so as to punch the images at any predetermined point.

Mounted upon the shaft 4 and driven thereby is a gear 5 which meshes with the gear 2 fixed to a crank shaft 8. The crank shaft is journaled for rotation in suitable brackets 1 and 26 supported on an appropriate base 27. To the crank shaft are secured a number of pitmen 9 which extend in a direction away from the projector P and are secured to a crosshead 21 in the form of a rod connected for sliding movement in slots 17 in the brackets 1 and 26. The links 23 are divided between the brackets on the rod 19 and extend in an upward direction with their upper ends slotted to embrace the crosshead 21. The connecting rod 14 is secured by a pivotal connection 10 at its forward end to a holder 11 to which the punch 6 is secured by means of the set screw 12. The rear end of the connecting rod 14 has a slotted connection 16, 18 with the core or armature 25 of a solenoid 15 which may be remotely controlled by any suitable electrical circuits. The links 23 are cut out as shown at 26' to receive the pin 20 carried by the connecting rod and extending through these cut-outs. It is to be noted from Figure 1 that the bases of the cut-outs are relatively broad, sufficiently in effect to permit operation of the links under the action of the pitmen without affecting the operation of the connecting rod. The upper end of the slots 26' are, however, relatively constricted so that if the connecting rod is raised to bring the pin 20 into the upper portion of these slots, pivotal movement of the links 23 will be translated into reciprocating movement of the connecting rod 14 to cause the film to be perforated.

The operation of the mechanism as practically employed is as follows: The film F is threaded through the machine P and into engagement with the film sprocket 3. The shaft 4 is then driven to intermittently drive the film in the usual manner. Simultaneously the shaft 4 directly drives the gear 5 which in turn drives the gear 2 causing the crank shaft to rotate and bringing about constantly operating reciprocation of the pitmen and corresponding oscillation of the links 23. The solenoid 15 is ordinarily deenergized and its core drops below its magnetic center so that the parts are as shown in Figure 1. If it be assumed that this machine is operating in synchronism with a standard motion picture projector, projecting images upon a screen, it will be apparent that the film F of my apparatus is travelling through the machine in identical relation to the corresponding film in the standard projector. The operator watching the projection and wishing to mark the film F at some particular point, closes the circuit to the solenoid 15 thus causing the armature to be raised and the pin 20 is lifted to the top of the cut-outs 26 with the result that upon the next forward impulse of the pitmen the punch is driven through the film to effectually mark the particular image which at that time is in a position at the aperture.

The gearing relation is such as to allow adequate time for the punching of the film while the film remains at rest at the aperture for, manifestly, since the sprocket 3 only rotates during one-quarter of a complete rotation of the shaft, three-quarters of such revolution is available for such perforating operation. The punch will operate once for every complete rotation of the shaft 4 and consequently if the solenoid is maintained in energized condition by maintaining the circuit thereto, successive images will be punched. However, if the circuit is only momentarily closed and opened as soon as a single punch has been accomplished, the connecting rod will immediately drop down into inactive condition so that successive images may be positioned at the aperture without perforation. After the film has been run through the machine, it may be used in the laboratory as stated to check up the companion film which has been projected, by a comparison effected optically or in any other suitable manner.

The foregoing detailed description sets forth the invention in its preferred practical form, but the invention is to be understood as fully commensurate with the appended claims.

Having thus fully described my invention, what I claim as new and desire to secure by Letters Patent is:

1. In an assembly of the character described, means to feed a film intermittently with interposed periods of dwell, corresponding to periods of projection, and manually controlled means operable on the film during said periods of dwell to mark such points in the length of the film as the operator may elect.

2. In an assembly of the character described, means to feed a film intermittently with interposed periods of dwell, corresponding to periods of projection, and a manually controlled die for puncturing the film within the area thereof corresponding to any particular image during the corresponding period of dwell.

3. In an assembly of the character described, a die, means to feed a film intermittently to position consecutive portions thereof in cooperative relation to the die with interposed periods of film dwell while such portions are juxtaposed with the die, and manually controlled means actuating the die to mark particular portions of the film during such periods of dwell as the operator may elect.

4. In an assembly of the character described, motion picture projection apparatus provided with an aperture, means for intermittently feeding the film past the aperture and into and out of cooperative relation with the die with periods of dwell as successive portions of the film are in cooperative relation to the die, and manually controlled means to actuate the die, at the will of the operator, to mark that portion of the film which is at rest in cooperative relation with the die.

5. In an assembly of the character described, motion picture projection apparatus provided with an aperture, means for intermittently feeding the film past the aperture and into and out of cooperative relation with the die with periods of dwell as successive portions of the film are in cooperative relation to the die, said means for feeding film including a shaft during one-quarter of each complete rotation whereof the film is driven while the film remains at rest during the remaining three-quarters of the rotation of said shaft, operative connections between said shaft and the die, said connections being normally potentially operative to actuate the die during periods of dwell of the film, and manually controlled means for rendering said operative connections effective to cause the die to mark the film.

6. In an assembly of the character described, motion picture projection apparatus provided with an aperture, a perforated plate positioned at the aperture, a film sprocket for feeding the film over said plate, a drive shaft operatively connected to the film sprocket to drive the film during one-quarter of each complete rotation of the shaft and to permit the film to dwell during the remaining three-quarters of such complete rotation, a crank having geared connections with the shaft, a pitman operable by said crank, a lever operatively connected at one end with the pitman and secured to a relatively fixed fulcrum, said lever being provided therein with a slot one portion of which has a width substantially equal to the effective throw of the crank shaft upon that part of the lever in which said portion of the slot is positioned, and another portion of the slot being relatively constricted, a connecting rod provided thereon with a trunnion extending into said slot and normally occupying a position in the enlarged portion thereof to permit the lever to operate without operating the connecting rod, a punch operable through the perforations in said plate and secured to the connecting rod, an electromagnetic means adapted to be manually controlled and operatively connected to the connecting rod to move the trunnion of said connecting rod into the constricted portion of the slot in the lever when the electromagnetic means is energized at the will of the operator, the geared connections between the shaft and the crank being timed to cause the punch to enter the perforated plate and perforate the film during periods of dwell of the film.

In testimony whereof, I have signed the foregoing specification.

SVATOPLUK C. VOLNEY.

CERTIFICATE OF CORRECTION.

Patent No. 1,891,251. December 20, 1932.

SVATOPLUK C. VOLNEY.

It is hereby certified that error appears in the printed specification of the above numbered patent requiring correction as follows: Page 3, after line 94, insert the following as claim 7 —

7. In an assembly of the character described, means to feed a film intermittently with interposed periods of dwell, corresponding to periods of projection, and manually controlled means operable on the film to mark such points in the length of the film as the operator may elect.;

and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.